United States Patent [19]

Tornay

[11] Patent Number: 5,199,454
[45] Date of Patent: Apr. 6, 1993

[54] VALVE STRUCTURE
[75] Inventor: Edmund G. Tornay, New York, N.Y.
[73] Assignee: Energy Transportation Group, Inc., New York, N.Y.
[21] Appl. No.: 510,932
[22] Filed: Apr. 19, 1990
[51] Int. Cl.[5] .............................. F16K 17/40
[52] U.S. Cl. .................. 137/68.1; 114/74 R
[58] Field of Search ........... 137/68.1; 251/305; 114/74 R

[56] References Cited
U.S. PATENT DOCUMENTS

| | | | |
|---|---|---|---|
| 3,074,421 | 1/1963 | Borcherdt | 137/68.1 |
| 4,085,764 | 4/1978 | Raidl, Jr. | 137/68.1 |
| 4,732,298 | 3/1988 | Dirslage | 137/68.1 X |

Primary Examiner—John C. Fox
Attorney, Agent, or Firm—Brumbaugh, Graves, Donohue & Raymond

[57] ABSTRACT

A valve structure for connecting an oil tank to a ballast tank separated by a bulkhead includes a butterfly valve bolted to a short section of flanged pipe which is welded or bolted to the bulkhead separating the two tanks in combination with a rupturable disk fitted within the pipe section and capable of withstanding the maximum pressure of either a full ballast tank or a full cargo tank. A cutting edge is secured to the rotatable disk of the butterfly valve which, upon opening of the butterfly valve, slices the disk sufficiently to assure its collapse and failure by liquid flowing through the opened butterfly valve.

5 Claims, 1 Drawing Sheet

FIG. 1.
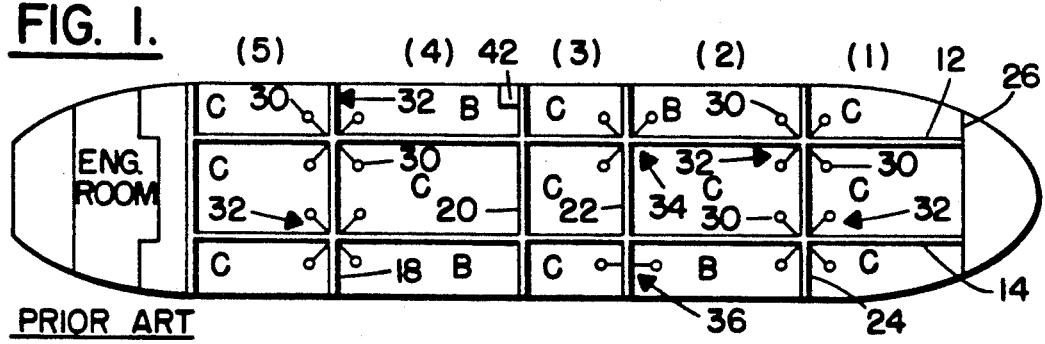
PRIOR ART
FIG. 2.
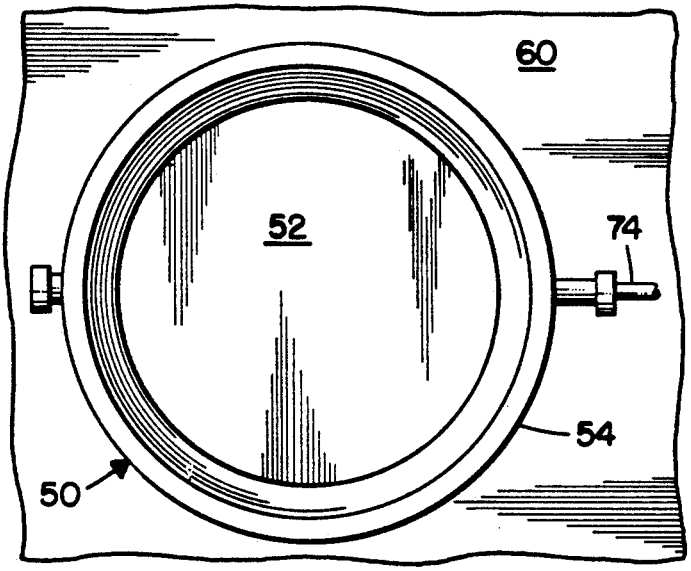
FIG. 3.
FIG. 4.
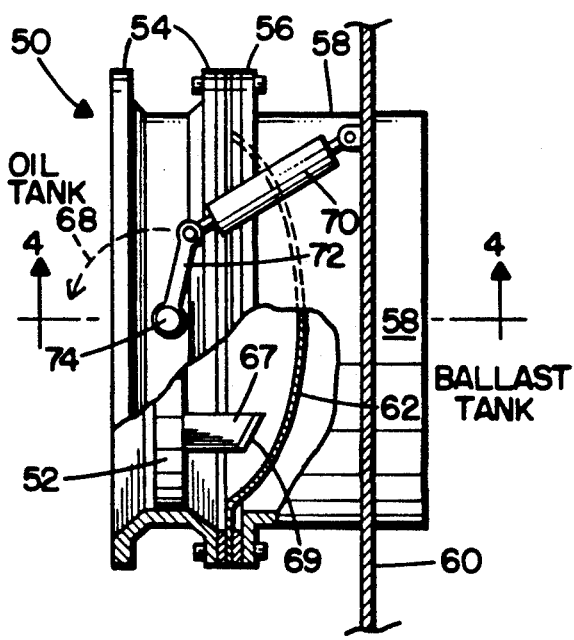
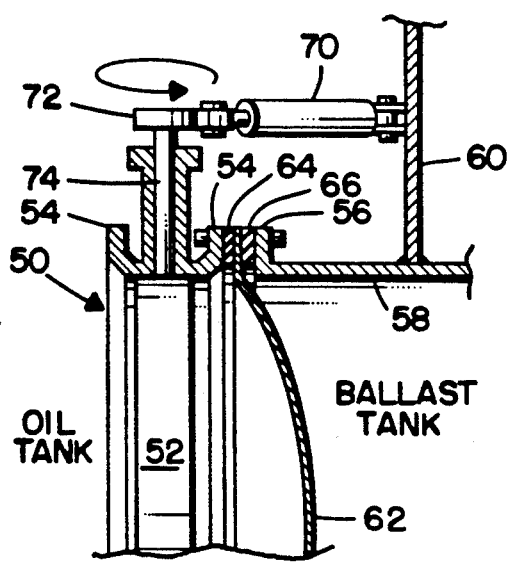

VALVE STRUCTURE

BACKGROUND OF THE INVENTION

This invention relates generally to valves of the butterfly type and, more particularly, to a double-seal valve structure in which a butterfly valve provides one of the seals and the other seal is provided by a rupturable disk arranged to be ruptured upon actuation of the butterfly valve. This valve structure is particularly useful in carrying out the method for control of oil leakage from a damaged tanker described in applicant's copending application Ser. No. 07/451,103, filed Dec. 15, 1989.

Briefly, the method described in the prior application minimizes the outflow of cargo from a damaged cargo tank of an oil tanker of the "segregated ballast" type by transferring oil out of the upper part of the damaged cargo tank and, at the same time, keeping the reduction of draft at the damaged area to a minimum. This is accomplished by valves and piping installed through selected bulkheads to connect each cargo tank to one or more ballast tanks, one or more of which are opened upon occurrence of damage sufficient to cause cargo tank leakage to allow oil to flow, by gravity, from the upper part of the damaged cargo tank or tanks to one or more ballast tanks which, if the tanker were fully loaded, would be empty. In the described system, each connection between a cargo tank and a ballast tank includes two valves, preferably of the butterfly type, connected in tandem, as required by regulations, to prevent oil contamination of ballast due to possible leakage of a valve in normal operation. Typically, the valves may have a diameter in the range between one foot and four feet, the choice being a trade-off between the cost of the valves and the rate at which it is desired to transfer oil from a damaged tank to one or more ballast tanks, and each valve is equipped with a valve actuator to quickly open or close the valve. Considering that a typical tanker may require at least ten such pairs of valves to effectively control oil leakage by the described method, the installation is obviously very expensive, not only from the standpoint of the cost of the valves themselves but also the cost of their installation.

It is a primary object of present invention to provide a valve arrangement for initiating gravity flow from a cargo tank to a ballast tank which is more effective for the purpose, and less expensive, than the paired butterfly valves of the prior art.

Another object is to provide a valve structure which satisfies regulations that require any connection between a cargo tank and a ballast tank to include two valves in tandem to prevent contamination of ballast, without relying on valve seals.

Still another object is to provide a valve arrangement of the character described which is relatively simple to construct at moderate cost.

Other objects, features and advantages of the invention, and a better understanding of its construction and operation, will be apparent from the following detailed description, taken in conjunction with the accompanying drawings.

BRIEF DESCRIPTION OF THE DRAWINGS

FIG. 1 is a diagrammatic plan view of an oil tanker of the segregated ballast type showing a typical installation of bulkhead valves for carrying out the method described in applicant's above-mentioned patent application;

FIG. 2 is in a front elevation view of a valve structure according to the invention;

FIG. 3 is a top view, partially cut away, of a valve structure according to the invention installed on a bulkhead; and FIG. 4 is a fragmentary elevation cross-sectional view taken along line 4—4 of FIG. 3.

DESCRIPTION OF THE PREFERRED EMBODIMENT

FIG. 1 diagrammatically illustrates an oil tanker 10 of the "segregated ballast" type which, as required by internationally standardized regulations, is sub-divided by longitudinal bulkheads, 12, 14 and transverse bulkheads 16, 18, 20, 22, 24, 26 to form a plurality of tanks, numbered (1) to (5) from bow to stern, some of which are dedicated for carriage of cargo oil and others of which are dedicated for carriage of seawater ballast, designated "C" and "B", respectively. The longitudinal bulkheads 12 and 14 together with portions of the transverse bulkheads define five center cargo oil tanks, and bulkheads 12 and 14 together with the hull and other portions of the transverse bulkhead define two sets of wing tanks alternately dedicated for cargo oil and ballast. While it is the intention of the aforementioned regulations that the ballast tank be used only for seawater ballast, the oil leakage control system described in the application uses the ballast tanks as receptacles for cargo oil in the event one or more cargo tanks are damaged.

When the tanker is fully loaded all of the cargo tanks "C" are filled almost to the top and the ballast tanks are all empty or near empty. In order to minimize out flow of oil in the event one or more cargo tanks is ruptured by grounding or collision, valves and associated piping are installed in the bulkheads to connect each cargo tank to one or more ballast tanks. As diagrammatically shown in FIG. 1, paired sluice valves 30, preferably of butterfly type, are installed with a connecting pipe or fitting in selected bulkheads shared by a cargo tank and a ballast tank. In the illustrated exemplary arrangement, pipe fittings 32 known as a "cross" are installed at each of four openings through the bulkhead, a "T" pipe fitting 34 is installed in an opening located at the intersection of longitudinal bulkhead 12 with transverse bulkhead 22, and a fitting 36 consisting of two valves connected by a straight section of pipe is installed in the bulkhead 22. The valve structure according to the present invention is intended to replace and serve the function of the paired valves shown in FIG. 1.

Referring to FIGS. 2-4, the valve structure according to the present invention includes a butterfly valve bolted to a short section of flanged pipe which is welded or bolted to a bulkhead which divides an oil tank from a ballast tank. The butterfly valve 50 is of conventional construction, and includes a circular valve disk 52 mounted in sealing relationship within a short flanged cylinder 54 for rotation about a vertical axis to effect opening and closing. As best seen in FIG. 4, one flange of the valve housing is bolted to a circumferential flange 56 formed at one end of a short section of flanged pipe 58, the other end of which is welded to a bulkhead 60 which separates an oil tank from a ballast tank. A rupturable circular disk 62 is secured at its periphery in sealing relationship with the pipe section 58 by a pair of annular sealing rings 64 and 66 disposed between the bolted-together flanges of the butterfly valve housing and the flanged pipe. The disk 62, which may be formed of stainless steel by way of example, is shown disposed on the ballast tank side of the butterfly valve, is convex in shape in the direction of the ballast tank, and is designed to withstand the maximum pressure of either a full ballast tank or a full cargo tank.

The disk 52 of the butterfly valve 50 has a cutting element 67 secured to the face thereof which faces disc 62, the cutting element having a cutting edge or edges 69 so disposed relative to the dome-shaped disk 62 as to slice the disk when the butterfly valve is opened by rotation of disk 52 in the direction indicated by the arrow 68 in FIG. 3. The butterfly valve disk is actuated by a conventional hydraulic ram 70 secured at one end to bulkhead 60 with its ram pivotally connected to one end of a crank arm 72, the other end of which is secured to the upper end of a vertically oriented spindle 74 secured to valve disk 52 and supported for rotation about a vertical axis by the butterfly valve casing. Alternatively, a conventional actuator mounted on the flanged cylinder may be used to open and close the valve.

Should it be necessary to open the valve, in response to a signal from a remote location actuator 70 rotates the butterfly valve disk 52, which, in turn, causes the cutting edge 69 to rupture the thin disk 62, which is designed to collapse and fail under the action of the oil flowing through the opened butterfly valve.

It will be evident that the described valve structure, in normal operation, has the advantage of preventing leakage from oil tank to ballast tank, or vice versa, without having to rely on the valve seal of the butterfly valve, by virtue of the sealing relationship between the rupturable disk and the pipe section. Since the valve structure cannot be opened without rupturing the disk, it has the advantage that it prevents the illicit carriage of oil in a ballast tank, which can quite easily be done with two butterfly valves installed in tandem. Because the ability of the butterfly valve to seal off the connection is not compromised when the rupturable disk is sliced, it can be used to reclose the connection to facilitate salvage operations after the casualty which, of course, would not be possible with the rupturable disk only. Also, as will be evident from examination of FIG. 4 the presence of disk 62 avoids having to submerge the butterfly valve mechanism and its actuator in corrosive seawater; instead, it is submerged in oil.

While a preferred embodiment of the invention has been illustrated and described, it will be evident that various changes and modifications may be effected without departing from the spirit and scope of the inventive concept. For example, although installation of the valve structure on a bulkhead with the rupturable disk facing the ballast tank as shown in the drawings offers the many advantages enumerated above, it is possible to have it face a cargo tank with the attendant advantage that there is no leakage of oil into the space between the rupturable disk and the disk of the butterfly valve. It is to be understood that the invention is not limited to the specific embodiment illustrated here, the intention being to cover by the appended claims all such modifications as fall within their scope.

I claim:

1. A valve structure adapted to be mounted in an opening in a bulkhead separating a liquid cargo tank from a ballast tank, said valve structure comprising, in combination:
    a section of cylindrical pipe adapted to be secured at a first end in an opening in a bulkhead and to extend into one of said tanks;
    a normally closed butterfly valve having a cylindrical housing secured to a second end of said pipe section, said butterfly valve including a circular disk which is rotatable relative to said housing from a closed position to an open position;
    a rupturable disk peripherally sealed to said pipe section at a location between the disk of said butterfly valve and said bulkhead; and
    means secured to said butterfly valve disk for severing said rupturable disk in response to rotation of said valve disk from its closed position thereby to allow liquid flowing through the opened butterfly valve to flow through and collapse the severed disk.

2. Valve structure according to claim 1, wherein said rupturable disk is dome-shaped with convexity toward said ballast tank and is capable of withstanding the maximum pressure of either a full ballast tank or a full cargo tank.

3. Valve structure according to claim 2, wherein said rupturable disk is constructed and arranged to collapse and fail after being severed by cargo liquid flowing through the opened butterfly valve.

4. Valve structure according to claim 1, wherein said pipe section is flanged at said second end,
    wherein said butterfly valve includes a flanged housing bolted to said flanged pipe section, and
    wherein said rupturable disk is clamped along its periphery between the bolted flanges of said pipe section and said butterfly valve housing and is dome-shaped with convexity toward said ballast tank.

5. Valve structure according to claim 4, wherein said rupturable disk is formed of a material which is non-corrosive to sea water and is shaped and dimensioned to withstand the maximum pressure of either a full ballast tank or a full cargo tank.

* * * * *